(12) United States Patent
Lee et al.

(10) Patent No.: US 12,420,678 B2
(45) Date of Patent: Sep. 23, 2025

(54) VEHICLE AND METHOD OF CONTROLLING ARRANGEMENT OF SEATS

(71) Applicants: Hyundai Motor Company, Seoul (KR); Kia Corporation, Seoul (KR)

(72) Inventors: Junkyung Lee, Seoul (KR); Changsub Kim, Gyeonggi-do (KR); Jae Sun Han, Seoul (KR); Ho Ssang Jo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 425 days.

(21) Appl. No.: 17/874,515

(22) Filed: Jul. 27, 2022

(65) Prior Publication Data
US 2023/0094017 A1 Mar. 30, 2023

(30) Foreign Application Priority Data
Sep. 27, 2021 (KR) .................. 10-2021-0127322

(51) Int. Cl.
| | |
|---|---|
| *B60N 2/00* | (2006.01) |
| *B60N 2/005* | (2006.01) |
| *B60N 2/01* | (2006.01) |
| *B60N 2/02* | (2006.01) |
| *B60N 2/06* | (2006.01) |
| *B60N 2/24* | (2006.01) |
| *B60N 2/30* | (2006.01) |
| *B60R 16/023* | (2006.01) |
| *B60R 16/037* | (2006.01) |
| *B60W 40/08* | (2012.01) |

(52) U.S. Cl.
CPC .......... *B60N 2/0244* (2013.01); *B60N 2/0268* (2023.08); *B60N 2230/20* (2023.08); *B60N 2230/30* (2023.08)

(58) Field of Classification Search
CPC .... B60N 2/0244; B60N 2/0268; B60N 2/002; B60N 2002/0212; B60N 2/0862
See application file for complete search history.

(56) References Cited

U.S. PATENT DOCUMENTS

| | | | |
|---|---|---|---|
| 10,300,832 B1 * | 5/2019 | Folks | B60N 2/309 |
| 2017/0313208 A1 * | 11/2017 | Lindsay | B60N 2/0276 |
| 2022/0144146 A1 * | 5/2022 | Kondrad | B60N 2/345 |

* cited by examiner

Primary Examiner — Scott A Browne
Assistant Examiner — Rami Nabih Bedewi
(74) Attorney, Agent, or Firm — Fox Rothschild LLP

(57) ABSTRACT

A control method of a vehicle is configured to control an arrangement of seats in the vehicle based on a number of occupants, a number of pieces of baggage and a baggage size, where the vehicle includes: a vehicle seat including at least one of a first seat, a second seat or a rear seat; a communicator configured to receive boarding information including information about at least one of the number of occupants or the number of pieces of baggage from a user terminal; and a controller configured to change at least one of a position and a form of the vehicle seat based on the boarding information.

18 Claims, 12 Drawing Sheets

VEHICLE AND METHOD OF CONTROLLING ARRANGEMENT OF SEATS

CROSS-REFERENCE TO RELATED APPLICATION

This application claims under 35 U.S.C. § 119 the benefit of Korean Patent Application No. 10-2021-0127322, filed on Sep. 27, 2021 in the Korean Intellectual Property Office, the entire contents of which are incorporated herein by reference.

BACKGROUND

1. Technical Field

The disclosure relates to a vehicle and a method of controlling an arrangement of seats in the vehicle based on a number of occupants, a number of pieces of baggage and a baggage size, and a control method thereof.

2. Description of the Related Art

Recently, as an increased amount of research has been conducted on autonomous driving, research on convenience related to autonomous driving is also being carried out. In particular, some research has focused not only an autonomous driving technology itself, but also on using an autonomous taxi more comfortably.

A seating arrangement of a driverless taxi may vary depending on a number of passengers, and a number of pieces of bags (e.g., baggage or luggage) and a size of the bags. In addition, research has been conducted on adjusting internal space of a driverless taxi based on information input by a user such as information about the number of users, the number of pieces of luggage and the luggage size.

Also, such research has been carried out in various fields such as driverless taxis, drones, drone taxis, etc.

SUMMARY

An aspect of the disclosure provides a vehicle and a control method thereof that may control an arrangement of seats in the vehicle based on a number of occupants, a number of pieces of baggage and a baggage size.

Additional aspects of the disclosure will be set forth in part in the description which follows and, in part, will be obvious from the description, or may be learned by practice of the disclosure.

According to an aspect of the disclosure, there is provided a vehicle, including: a vehicle seat including at least one of a first seat, a second seat or a rear seat; a communicator configured to receive boarding information including information about at least one of a number of occupants or a number of pieces of baggage from a user terminal; and a controller configured to change at least one of a position or a form of the vehicle seat based on the boarding information.

The controller is configured to change the form of the vehicle seat to unfold the rear seat, when the number of occupants is less than a first predetermined number of occupants.

The controller is configured to change the form of the vehicle seat to unfold the rear seat and the second seat, when the number of occupants is greater than or equal to a first predetermined number of occupants and less than a second predetermined number of occupants.

The controller is configured to change the form of the vehicle seat to unfold the rear seat, the second seat and the first seat, when the number of occupants is greater than or equal to a second predetermined number of occupants.

The controller is configured to change a position of the rear seat to move the rear seat forward by a first predetermined distance from a reference point, when the number of pieces of baggage is less than a first predetermined number of pieces of baggage.

The controller is configured to change the position of the rear seat to move the rear seat forward by a second predetermined distance from the reference point, when the number of pieces of baggage is greater than or equal to the first predetermined number of pieces of baggage and less than a second predetermined number of pieces of baggage, the second predetermined distance being greater than the first predetermined distance.

The controller is configured to change the position of the rear seat to move the rear seat forward by a third predetermined distance from the reference point, when the number of pieces of baggage is greater than or equal to the second predetermined number of pieces of baggage and less than a third predetermined number of pieces of baggage, the third predetermined distance being greater than the second predetermined distance.

The communicator is configured to acquire the boarding information including information about a baggage size.

The controller is configured to change the position of the rear seat to move the rear seat forward by a fourth predetermined distance from the reference point, when the number of pieces of baggage is less than the first predetermined number of pieces of baggage and the baggage size is greater than or equal to a predetermined size, the fourth predetermined distance being greater than the first predetermined distance and less than the second predetermined distance.

The controller is configured to change the position of the rear seat to move the rear seat forward by a fifth predetermined distance from the reference point, when the number of pieces of baggage is greater than or equal to the first predetermined number of pieces of baggage and less than the second predetermined number of pieces of baggage and the baggage size is greater than or equal to the predetermined size, the fifth predetermined distance being greater than the second predetermined distance and less than the third predetermined distance.

The controller is configured to change the position of the rear seat to move the rear seat forward by a sixth predetermined distance from the reference point, when the number of pieces of baggage is greater than or equal to the third predetermined number of pieces of baggage and the baggage size is greater than or equal to the predetermined size, the sixth predetermined distance being greater than the third predetermined distance.

The communicator is configured to receive, from the user terminal, information corresponding to a user command input to each image displayed on a display of the user terminal, each of the images corresponding to the first seat, the second seat and the rear seat of the vehicle.

The controller is configured to change the at least one of the position or the form of the vehicle seat based on the information corresponding to the user command, the information being received through the communicator.

According to another aspect of the disclosure, there is provided a control method of a vehicle, the control method including: receiving boarding information including information about at least one of a number of occupants or a number of pieces of baggage from a user terminal through a communicator; and changing at least one of a position or a form of a vehicle seat based on the boarding information, the vehicle seat including at least one of a first seat, a second seat or a rear seat.

The changing of the at least one of the position or the form of the vehicle seat includes changing the form of the vehicle seat to unfold the rear seat, when the number of occupants is less than a first predetermined number of occupants.

The changing of the at least one of the position or the form of the vehicle seat includes changing the form of the vehicle seat to unfold the rear seat and the second seat, when the number of occupants is greater than or equal to a first predetermined number of occupants and less than a second predetermined number of occupants.

The changing of the at least one of the position or the form of the vehicle seat includes changing the form of the vehicle seat to unfold the rear seat, the second seat and the first seat, when the number of occupants is greater than or equal to a second predetermined number of occupants.

The changing of the at least one of the position or the form of the vehicle seat includes changing a position of the rear seat to move the rear seat forward by a first predetermined distance from a reference point, when the number of pieces of baggage is less than a first predetermined number of pieces of baggage.

The changing of the at least one of the position or the form of the vehicle seat includes changing the position of the rear seat to move the rear seat forward by a second predetermined distance from the reference point, when the number of pieces of baggage is greater than or equal to the first predetermined number of pieces of baggage and less than a second predetermined number of pieces of baggage, the second predetermined distance being greater than the first predetermined distance.

The changing of the at least one of the position or the form of the vehicle seat includes changing the position of the rear seat to move the rear seat forward by a third predetermined distance from the reference point, when the number of pieces of baggage is greater than or equal to the second predetermined number of pieces of baggage and less than a third predetermined number of pieces of baggage, the third predetermined distance being greater than the second predetermined distance.

The changing of the at least one of the position or the form of the vehicle seat includes acquiring the boarding information including information about a baggage size through the communicator, and changing the position of the rear seat to move the rear seat forward by a fourth predetermined distance from the reference point, when the number of pieces of baggage is less than the first predetermined number of pieces of baggage and the baggage size is greater than or equal to a predetermined size, the fourth predetermined distance being greater than the first predetermined distance and less than the second predetermined distance.

The changing of the at least one of the position or the form of the vehicle seat includes changing the position of the rear seat to move the rear seat forward by a fifth predetermined distance from the reference point, when the number of pieces of baggage is greater than or equal to the first predetermined number of pieces of baggage and less than the second predetermined number of pieces of baggage and the baggage size is greater than or equal to the predetermined size, the fifth predetermined distance being greater than the second predetermined distance and less than the third predetermined distance.

The changing of the at least one of the position or the form of the vehicle seat includes changing the position of the rear seat to move the rear seat forward by a sixth predetermined distance from the reference point, when the number of pieces of baggage is greater than or equal to the third predetermined number of pieces of baggage and the baggage size is greater than or equal to the predetermined size, the sixth predetermined distance being greater than the third predetermined distance.

The control method further includes: receiving information corresponding to a user command input to each image displayed on a display of the user terminal from the user terminal through the communicator, each of the images corresponding to the first seat, the second seat and the rear seat of the vehicle, and wherein the changing of the at least one of the position or the form of the vehicle seat includes changing the at least one of the position or the form of the vehicle seat based on the information corresponding to the user command, the information being received through the communicator.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
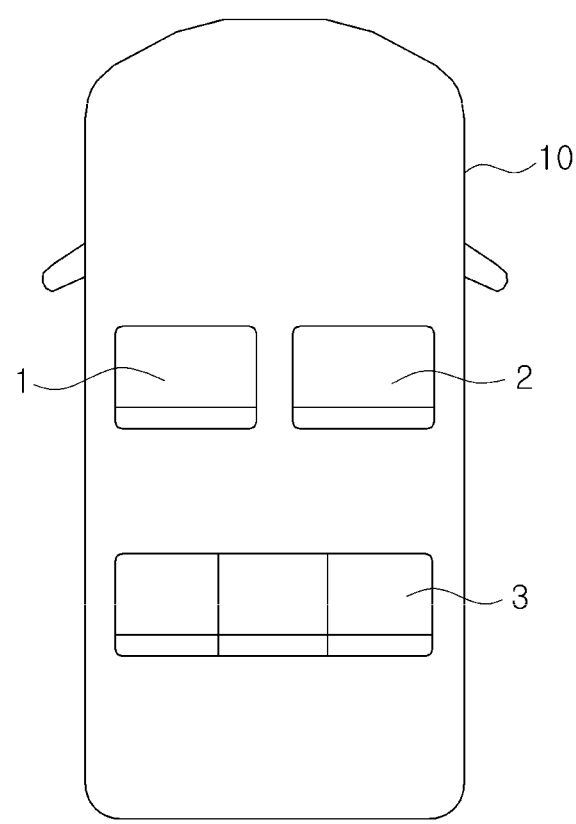
FIG. 1 is a diagram illustrating an example of a basic arrangement of seats of a vehicle according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

It will be understood that when an element is referred to as being "connected" to another element, it can be directly or indirectly connected to the other element, wherein the indirect connection includes "connection" via a wireless communication network.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

Figure 2:
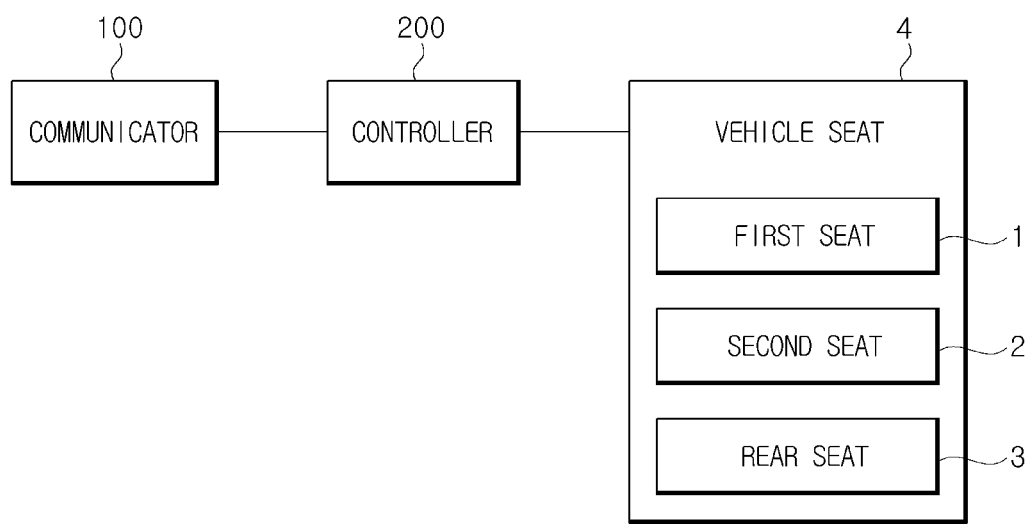
FIG. 2 is a control block diagram illustrating a vehicle according to an embodiment.

FIG. 1 is a diagram illustrating an example of a basic arrangement of seats of a vehicle according to an embodiment. FIG. 2 is a control block diagram illustrating a vehicle according to an embodiment.

Referring to FIGS. 1 and 2, a vehicle 10 may include a vehicle seat 4, a communicator 100 and a controller 200. The vehicle seat 4 includes at least one of a first seat 1, a second seat 2 or a rear seat 3. The communicator 100 receives boarding information including information about at least one of the number of occupants or the number of pieces of baggage from a user terminal. The controller 200 receives the boarding information through the communicator 100 and changes at least one of a position or a form of the vehicle seat 4 based on the boarding information. The vehicle 10 may refer to a robot taxi. The robot taxi may refer to a driverless taxi. Also, the vehicle 10 may be driven using a lithium battery. The vehicle 10 may receive the boarding information including information about the number of occupants and the number of pieces of baggage from the user terminal through the communicator 100. In this instance, the communicator 100 may acquire the boarding information, input to the user terminal, from a management server. When a user makes a reservation for the robot taxi and inputs the boarding information through the user terminal, the boarding information may be transmitted to the management server. Afterwards, the vehicle 10 may receive the boarding information from the management server through the communicator 100. Afterwards, the controller 200 may receive the boarding information through the communicator 100, and change at least one of the position or the form of the vehicle seat 4 including the at least one of the first seat 1, the second seat 2 or the rear seat 3, based on the boarding information. Here, although a driver is not required according to an embodiment, the first seat 1 may refer to a seat where a driver is seated in the vehicle 10 that generally requires the driver, and may generally refer to a left front seat. The second seat 2 may refer to a right front seat, and the rear seat 3 may refer to a seat positioned at a rear. For example, when the number of occupants is 3 and the number of pieces of baggage is 2 at a time of booking for the robot taxi, an interior space of the robot taxi may be changed in advance according to the number of occupants and the number of pieces of baggage. Changing the position and the form of the vehicle seat 4 may refer to an operation of unfolding the seats of the vehicle 10 to enable an occupant to sit or moving the seats of the vehicle 10 to a front or the rear to secure a space. Also, the controller 200 may change the form of the vehicle seat 4 to unfold the rear seat 3, when the number of occupants is less than a first predetermined number of occupants based on the boarding information. The first predetermined number of occupants may be 3. That is, when the number of occupants is 1 or 2, the one or two occupants may board the vehicle 10 simply by unfolding the rear seat 3. In this instance, the user may arbitrarily adjust the positions of the seats and whether the seats are folded through a user interface of the user terminal, which will be described later. Also, basically, a basic state of the rear seat 3 may refer to an unfolded state. When the number of occupants is greater than or equal to the first predetermined number of occupants and less than a second predetermined number of occupants, the controller 200 may change the form of the vehicle seat 4 to unfold the rear seat 3 and the second seat 2 based on the boarding information. In this instance, the second predetermined number of occupants may be 4. For example, when the number of occupants is 3, all the three occupants may not board the vehicle 10 only by unfolding the rear seat 3. Accordingly, the controller 200 may change the form of the vehicle seat 4 to unfold the second seat 2 and the rear seat 3 so that all the three occupants may board the vehicle 10. In this instance, as described above, the user may arbitrarily adjust the positions of the seats and whether the seats are folded through the user interface of the user terminal. When the number of occupants is greater than or equal to the second predetermined number of occupants, the controller 200 may change the form of the vehicle seat 4 to unfold the rear seat 3, the second seat 2 and the first seat 1. For example, when the number of occupants is greater than or equal to 4, all the occupants may not board the vehicle 10 simply by unfolding the rear seat 3 and the second seat 2 only. Accordingly, the first seat 1 may be unfolded so that all the occupants may board the vehicle 10. A reference point may refer to a position where the rear seat 3 of the vehicle 10 is set basically. That is, in a case of the robot taxi, the reference point may refer to a standard position arranged before a reservation is made. In this instance, the vehicle 10 may be a structure where only the first seat 1 and the second seat 2 may be unfolded under the assumption that the rear seat 3 is basically unfolded.

The first seat 1 and the second seat 2 may further perform a sliding function by forming a rail structure under the seats, in addition to the folding and unfolding described above. In this instance, the first seat 1 and the second seat 2 may move forward and/or backward through the rail structure, and thus a space at the front or the rear may be secured.

The communicator 100 may include at least one constituent component capable of communicating with an external device, for example, at least one of a local area communication module, a wireless communication module or a wired communication module.

The local area communication module may include a variety of local area communication modules capable of transmitting and receiving a signal using a wireless communication network in a short distance, such as a Bluetooth module, an infrared communication module, a radio frequency identification (RFID) communication module, a wireless local access network (WLAN) communication module, a near field communication (NFC) communication module, zigbee communication module, and the like.

The wired communication module may include a variety of wired communication modules such as a local area network (LAN) module, a wide area network (WAN) module, a value added network (VAN), or the like, and a variety of cable communication modules such as universal serial bus (USB), high definition multimedia interface (HDMI), digital visual interface (DVI), recommended standard 232 (RS-232), power line communication, plain old telephone service (POTS), or the like.

The wireless communication module may include wireless communication modules supporting a variety of wireless communication methods, e.g., Wi-Fi module, wireless broadband module, global system for mobile (GSM) communication, code division multiple access (CDMA), wideband code division multiple access (WCDMA), universal mobile telecommunications system (UMTS), time division multiple access (TDMA), long term evolution (LTE), and the like.

The wireless communication module may include a wireless communication interface including a transmitter and an antenna that transmits a signal. Also, the wireless communication module may further include a signal conversion module that modulates a digital control signal output from the controller 200 through the wireless communication interface into an analog wireless signal under control of the controller 200.

The wireless communication module may include a wireless communication interface including a receiver and an antenna that receives a signal. Also, the wireless communication module may further include a signal conversion module that demodulates an analog wireless signal received through the wireless communication interface into a digital control signal under control of the controller 200.

The controller 200 may be implemented as a memory that stores data about an algorithm for controlling operations of the constituent components of the vehicle 10 or a program that reproduces the algorithm, or as a processor that performs the aforementioned operations using the data stored in the memory. In this instance, the memory and the processor may be provided as physically separated chips, or be integrated into one chip.

A storage may be implemented with at least one of a non-volatile memory such as cache, read only memory (ROM), programmable read only memory (PROM), erasable programmable read only memory (EPROM), electrically erasable programmable read only memory (EEPROM) and flash memory, a volatile memory such as random access memory (RAM), and storage medium such as hard disk drive (HDD) and compact disc read only memory (CD-ROM), without being limited thereto. The storage may be a memory implemented as a chip physically separated from the processor, or a chip integrated into the processor, as described above in relation to the controller 200.

At least one constituent component may be added or omitted according to performances of the constituent components of the vehicle 10 shown in FIGS. 1 and 2. Also, those skilled in the art will appreciate that positions of the constituent components of the vehicle 10 may be modified according to a performance or a structure of a system.

Meanwhile, each of the constituent components shown in FIGS. 1 and 2 may refer to a software and/or a hardware component such as a field programmable gate array (FPGA) and application specific integrated circuit (ASIC).

Figure 3:
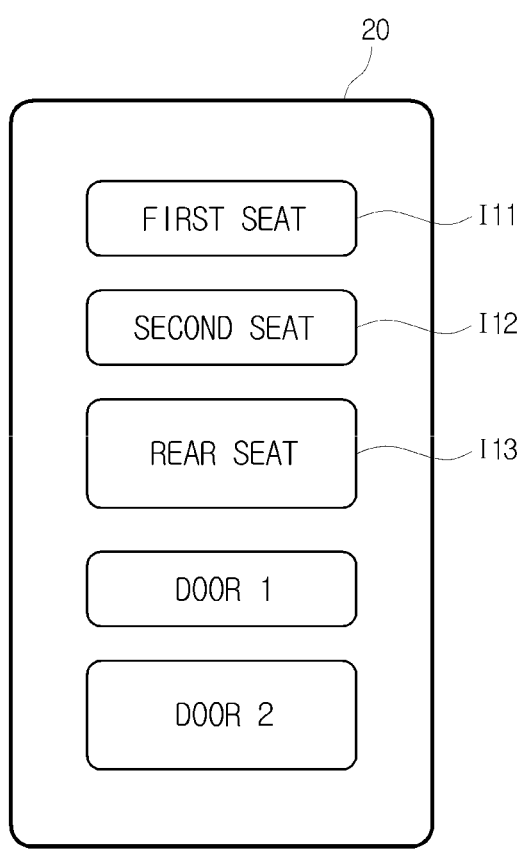
FIG. 3 is a diagram illustrating an example of a user interface displaying whether seats are folded according to an embodiment.

FIG. 3 is a diagram illustrating an example of a user interface displaying whether seats are folded according to an embodiment.

Referring to FIG. 3, whether a first seat is folded I11, whether a second seat is folded I12, and whether a rear seat is folded I13 may be displayed on the user interface of a user terminal 20 for user's convenience. Whether each of the seats is folded may be displayed on the user interface of the user terminal 20 in various manners in addition to the example of FIG. 3.

Figure 4:
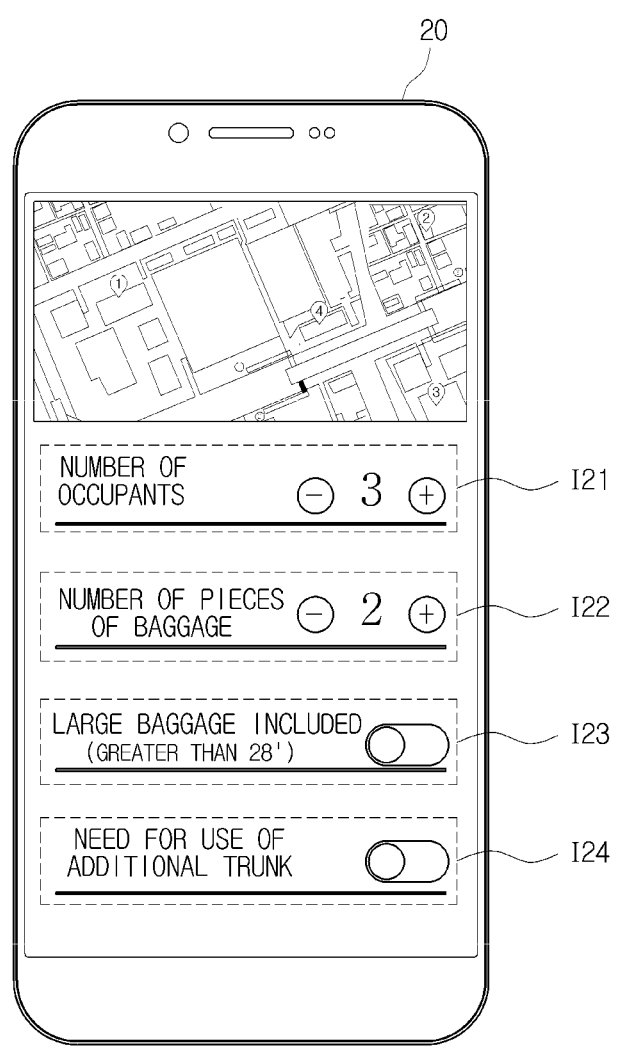
FIG. 4 is a diagram illustrating an example of boarding information input by a user according to an embodiment.

FIG. 4 is a diagram illustrating an example of boarding information input by a user according to an embodiment.

Referring to FIG. 4, information about the number of occupants 121, information about the number of pieces of baggage 122, information about a large piece of baggage 123, and information about a need for use of an additional trunk 124 may be displayed on the user terminal 20. Here, the large piece of baggage may refer to a bag whose size is larger than a predetermined size, and the need for use of additional trunk may refer to a case when trunks in various shapes are required.

Figure 5:
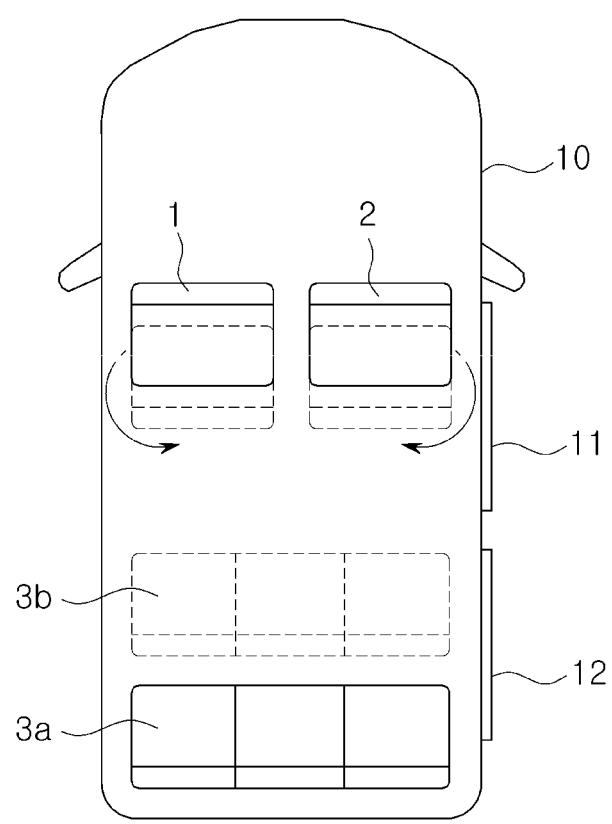
FIG. 5 is a diagram illustrating an example of an operation of changing positions and forms of seats of a vehicle according to an embodiment.

FIG. 5 is a diagram illustrating an example of an operation of changing positions and forms of seats of a vehicle according to an embodiment.

In FIG. 5, a plurality of seats of the vehicle 10 are shown. The first seat 1 and the second seat 2 may be changed to be unfolded according to the number of occupants so that all the occupants may sit, and the same is true for a rear seat. Also, a form and a position of the rear seat may be changed according to the number of pieces of baggage and a baggage size. A rear seat 3*a* is a reference point set with an assumption that the baggage does not exist. When the number of pieces of baggage increases or according to a baggage size, a position of a rear seat 3*b* may be newly set by moving the rear seat 3*a* forward. In this instance, the baggage may be placed in a space generated by moving the rear seat 3*a* forward. The vehicle 10 may include a front door 11 and a rear door 12 which is used as a tailgate.

Figure 6A:
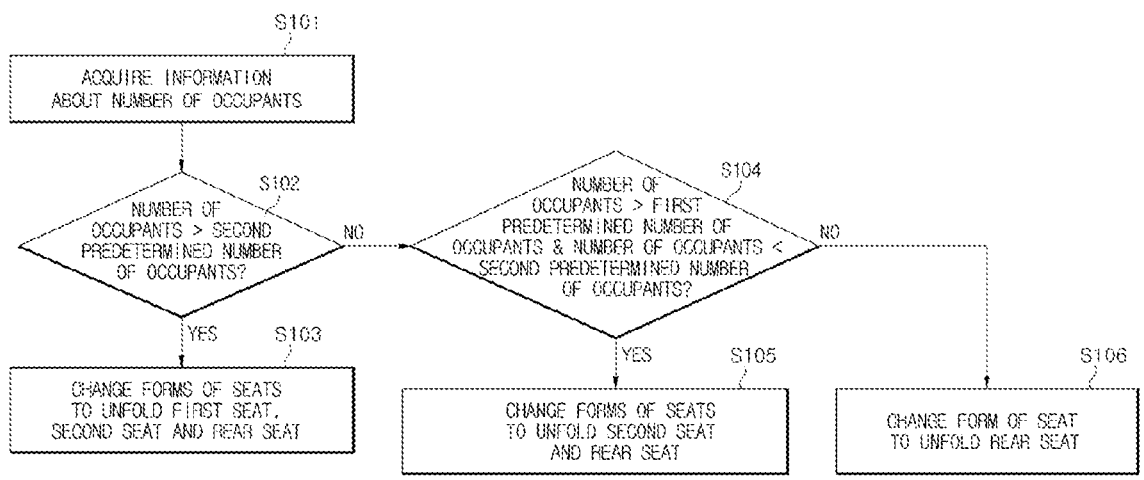
FIG. 6A is a flowchart illustrating an example of operations of changing forms of seats of a vehicle based on the number of occupants according to an embodiment.

FIG. 6A is a flowchart illustrating an example of operations of changing forms of seats of a vehicle based on the number of occupants according to an embodiment.

The controller 200 may acquire information about the number of occupants (S101). Afterwards, the controller 200 may compare the number of occupants and a second predetermined number of occupants (S102). When the number of occupants is greater than or equal to the second predetermined number of occupants, the controller 200 may change the forms of the seats to unfold a rear seat, a first seat and a second seat (S103). When the number of occupants is less than the second predetermined number of occupants, the controller 200 may compare the number of occupants and a first predetermined number of occupants (S104). When the number of occupants is greater than or equal to the first predetermined number of occupants and less than the second predetermined number of occupants, the controller 200 may change the forms of the seats to unfold the rear seat and the second seat (S105). Otherwise, i.e., when the number of occupants is less than the first predetermined number of occupants, the controller 200 may change the form of the seat to unfold the rear seat (S106).

Figure 6B:
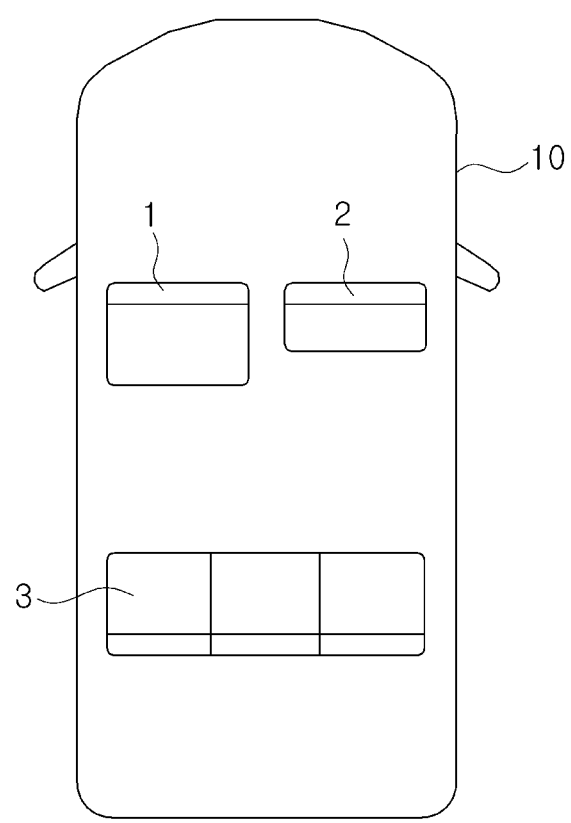
FIG. 6B is a diagram illustrating an example where forms of seats of a vehicle are changed based on the number of occupants according to an embodiment.

FIG. 6B is a diagram illustrating an example where forms of seats of a vehicle are changed based on the number of occupants according to an embodiment.

FIG. 6B illustrates a state when only a portion of seats are unfolded according to the number of occupants. When the number of occupants in the vehicle 10 is 3, the rear seat 3 and the second seat 2 may be unfolded. FIG. 6B illustrates a state that the first seat 1 is unfolded instead of the second seat 2.

Figure 7:
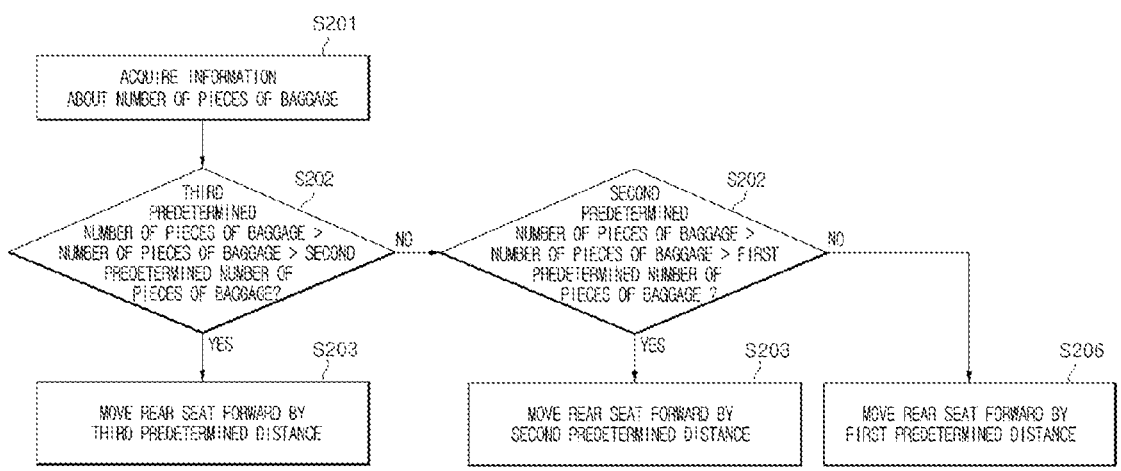
FIG. 7 is a flowchart illustrating an example of operations of changing positions of seats of a vehicle based on the number of pieces of baggage according to an embodiment.

FIG. 7 is a flowchart illustrating an example of operations of changing positions of seats of a vehicle based on the number of pieces of baggage according to an embodiment. The controller 200 may acquire information about the number of pieces of baggage (S201). Afterwards, the controller 200 may compare the number of pieces of baggage to a third predetermined number of pieces of baggage and a second predetermined number of pieces of baggage (S202). When the number of pieces of baggage is less than the third predetermined number of pieces of baggage and greater than or equal to the second predetermined number of pieces of baggage, the controller 200 may move the rear seat forward by a third predetermined distance (S203). In this instance, a user may set a first seat and a second seat to move, in addition to the rear seat. When the number of pieces of baggage is less than the second predetermined number of pieces of baggage, the controller 200 may compare the number of pieces of baggage to a first predetermined number of pieces of baggage and the second predetermined number of pieces of baggage (S204). When the number of pieces of baggage is less than the second predetermined number of pieces of baggage and greater than or equal to the first predetermined number of pieces of baggage, the controller 200 may move the rear seat forward by a second predetermined distance from a reference point (S205). When the number of pieces of baggage is less than the first predetermined number of pieces of baggage, the controller 200 may move the rear seat forward by a first predetermined distance from the reference point (S206).

When the number of pieces of baggage is less than the first predetermined number of pieces of baggage, the controller 200 may change a position of the rear seat to move forward by the first predetermined distance from the reference point based on the information about the number of pieces of baggage. The first predetermined number of pieces of baggage may be 3. Also, the first predetermined distance may be 30 cm. In this instance, the first predetermined number of pieces of baggage and the first predetermined distance may not be specifically determined and may vary according to setting of the user. For example, when the number of pieces of baggage is 1, the one baggage may be placed by moving forward by 30 cm only. A distance to move the rear seat forward may vary depending on a baggage size, which will be described later. When the number of pieces of baggage is greater than or equal to the first predetermined number of pieces of baggage and less than the second predetermined number of pieces of baggage based on the information about the number of pieces of baggage, the controller 200 may change the position of the rear seat to move the rear seat forward by the second predetermined distance from the reference point. Here, the second predetermined distance is greater than the first predetermined distance, the second predetermined number of pieces of baggage may be 5, and the second predetermined distance may be 40 cm. However, the second predetermined number of pieces of baggage and the second predetermined distance may be set by the user, without being limited thereto. When the number of pieces of baggage is greater than or equal to the second predetermined number of pieces of baggage and less than the third predetermined number of pieces of baggage based on the information about the number of pieces of baggage, the controller 200 may change the position of the rear seat to move the rear seat forward by the third predetermined distance from the reference point. Here, the third predetermined distance is greater than the second predetermined distance, and may be 70 cm. However, the third predetermined distance may be set by the user without being limited thereto. Also, the third predetermined number of pieces of baggage may be 7, but may be set by the user without being limited thereto.

Figure 8:
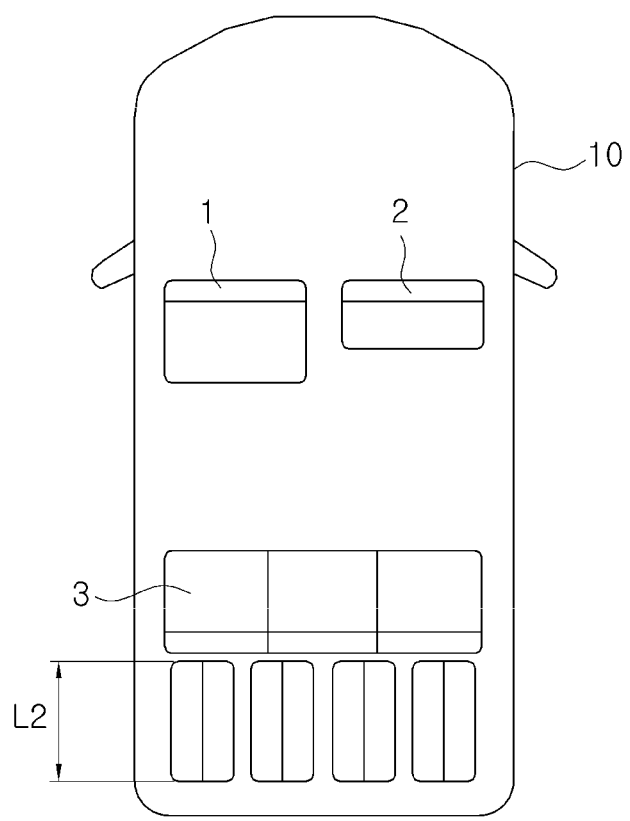
FIG. 8 is a diagram illustrating an example where positions of seats of a vehicle are changed based on the number of pieces of baggage and a baggage size according to an embodiment.

FIG. 8 is a diagram illustrating an example where positions of seats of a vehicle are changed based on the number of pieces of baggage and a baggage size according to an embodiment.

FIG. 8 illustrates an interior of the vehicle 10. Forms and positions of the seats of the vehicle 10 may be changed according to the number of occupants, the number of pieces of baggage and a baggage size input by a user. A state where four pieces of baggage exist is illustrated in FIG. 8. In this case, the forms and the positions of the first seat 1, the second seat 2 and the rear seat 3 may be changed. An extent to which the rear seat 3 moves forward varies according to the number of pieces of baggage and the baggage size. The positions of the first seat 1 and the second seat 2 may also be changed according to the number of pieces of baggage and the baggage size. Assuming that the rear seat 3 moves forward, the baggage may be placed in a space corresponding to a length L2 generated by moving the rear seat 3 forward. Accordingly, the length L2 generated by moving the rear seat 3 forward may vary according to the number of pieces of baggage and the baggage size, which may be applied to the first to sixth predetermined distances described above.

Figure 9:
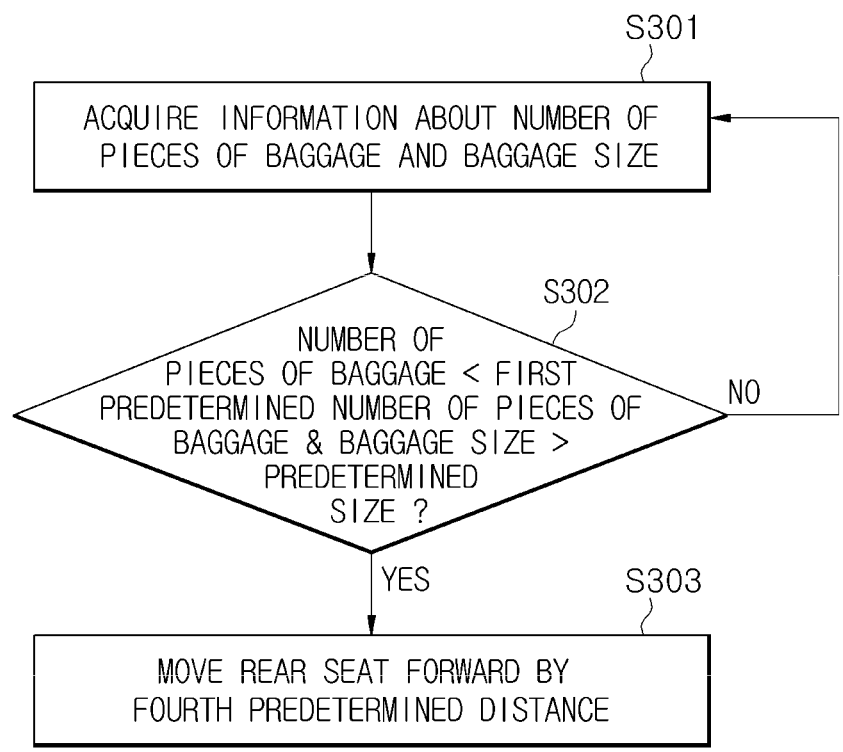
FIG. 9 is a flowchart illustrating an example of operations of changing positions of seats of a vehicle based on the number of pieces of baggage and a baggage size according to an embodiment.

FIG. 9 is a flowchart illustrating an example of operations of changing positions of seats of a vehicle based on the number of pieces of baggage and a baggage size according to an embodiment. Referring to FIG. 9, the controller 200 may acquire information about the number of pieces of baggage and the baggage size (S301). Afterwards, the controller 200 may compare the number of pieces of baggage and a first predetermined number of pieces of baggage, and compare the baggage size and a predetermined size (S302). When the number of pieces of baggage is less than the first predetermined number of pieces of baggage and the baggage size is greater than or equal to the predetermined size, the controller 200 may move a rear seat forward from a reference point by a fourth predetermined distance (S303).

That is, when the number of pieces of baggage is less than the first predetermined number of pieces of baggage based on the information about the number of pieces of baggage and the baggage size is greater than or equal to the predetermined size based on the information about the baggage size, the controller 200 may move the rear seat forward from the reference point by the fourth predetermined distance which is greater than a first predetermined distance and less than a second predetermined distance. In this instance, the fourth predetermined distance may be 35 cm, but may be set by a user without being limited thereto.

Figure 10:
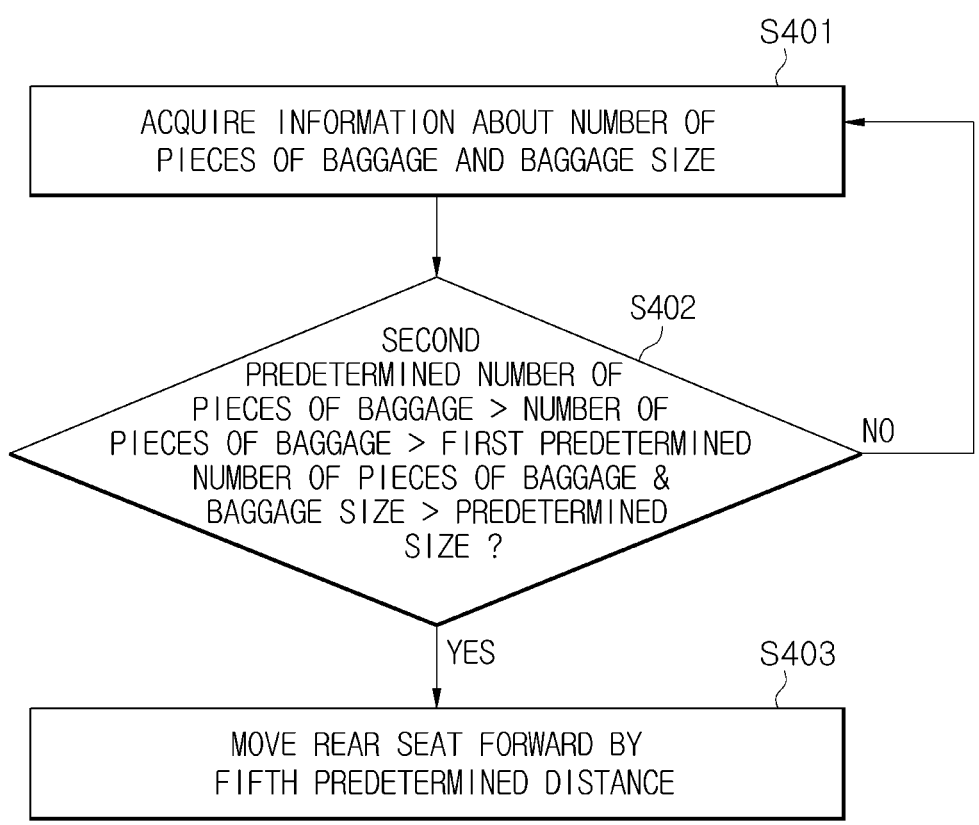
FIG. 10 is a flowchart illustrating an example of operations of changing positions of seats of a vehicle based on the number of pieces of baggage and a baggage size according to an embodiment.

FIG. 10 is a flowchart illustrating an example of operations of changing positions of seats of a vehicle based on the number of pieces of baggage and a baggage size according to an embodiment. Referring to FIG. 10, the controller 200 may acquire information about the number of pieces of baggage and the baggage size (S401). Afterwards, the controller 200 may determine whether the number of pieces of baggage is greater than or equal to a first predetermined number of pieces of baggage and less than a second predetermined number of pieces of baggage, and compare the baggage size and a predetermined size (S402). When the number of pieces of baggage is greater than or equal to the first predetermined number of pieces of baggage and less than the second predetermined number of pieces of baggage and the baggage size is greater than or equal to the predetermined size, the controller 200 may move a rear seat forward by a fifth predetermined distance (S403).

That is, when the number of pieces of baggage is greater than or equal to the first predetermined number of pieces of baggage and less than the second predetermined number of pieces of baggage based on the information about the number of pieces of baggage and the baggage size is greater than or equal to the predetermined size based on the information about the baggage size, the controller 200 may a position of the rear seat to move the rear seat forward from a reference point by the fifth predetermined distance which is greater than a second predetermined distance and less than a third predetermined distance. Here, the fifth predetermined distance may be 50 cm, but may be arbitrarily set by a user without being limited thereto.

Figure 11:
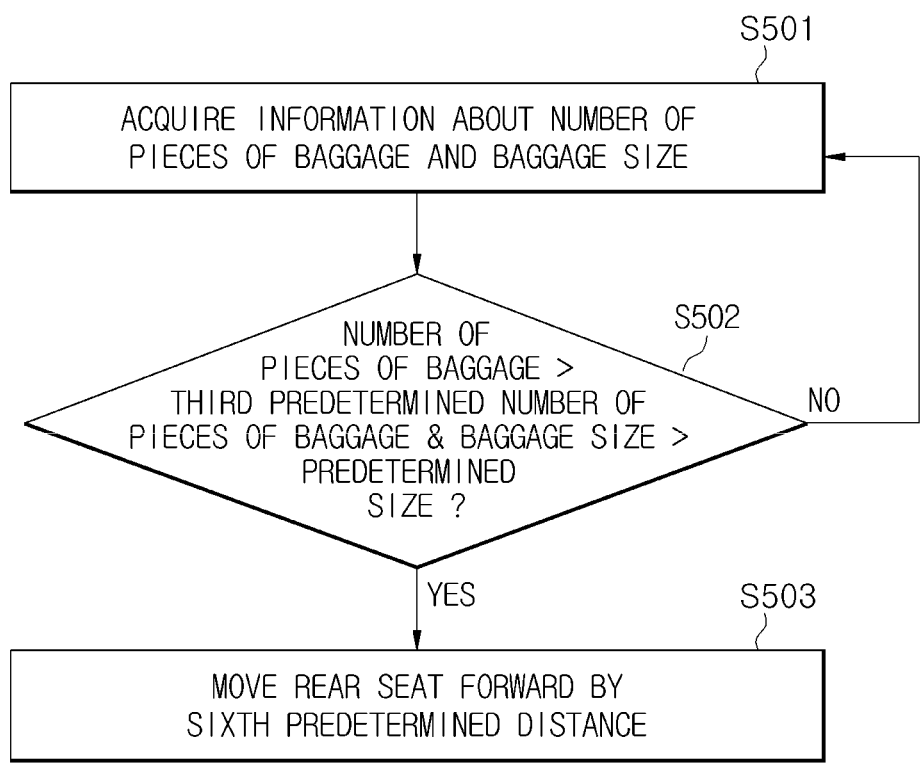
FIG. 11 is a flowchart illustrating an example of operations of changing positions of seats of a vehicle to the furthest based on the number of pieces of baggage and a baggage size according to an embodiment.

FIG. 11 is a flowchart illustrating an example of operations of changing positions of seats of a vehicle to the furthest based on the number of pieces of baggage and a baggage size according to an embodiment.

The controller 200 may acquire information about the number of pieces of baggage and the baggage size (S501). The controller 200 may compare the number of pieces of baggage and a third predetermined number of pieces of baggage, and compare the baggage size and a predetermined size (S502). When the number of pieces of baggage is greater than or equal to the third predetermined number of pieces of baggage and the baggage size is greater than or equal to the predetermined size, the controller 200 may move a rear seat forward by a sixth predetermined distance (S503).

That is, when the number of pieces of baggage is greater than or equal to the third predetermined number of pieces of baggage based on the information about the number of pieces of baggage and the baggage size is greater than or equal to the predetermined size based on the information about the baggage size, the controller 200 may change a position of the rear seat to move the rear seat forward by the sixth predetermined distance which is greater than a third predetermined distance. Here, the sixth predetermined distance may be 70 cm or more, i.e., a distance for providing a maximum trunk space. The predetermined size may refer to a size of a large baggage. Also, the predetermined size may be 28 inches, but may be set by a user without being limited thereto. The communicator 100 may receive information corresponding to a user command input to each image displayed on a display of a user terminal. Here, each of the images displayed on the display corresponds to a first seat, a second seat and a rear seat of the vehicle 10, respectively. The controller 200 may change at least one of the position or form of the seats based on the received information corresponding to the user command. That is, the images corresponding to each of the first seat, the second seat and the rear seat may be displayed on the user terminal. Also, the positions of the seats corresponding to each of the image may be changed or the seats corresponding to each of the images may be unfolded by dragging or clicking the image using the user's fingers. That is, when the user desires to move the rear seat forward, the rear seat may be moved forward by dragging the image corresponding to the rear seat.

As is apparent from the above, according to the embodiment of the disclosure, the vehicle and the control method thereof can control seats of the vehicle based on information input by a user, and thereby can improve a user's convenience.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle, comprising:
   a vehicle seat including at least one of a first seat, a second seat or a rear seat;
   a communicator configured to receive boarding information including information about at least one of a number of occupants or a number of pieces of baggage from a user terminal; and
   a controller configured to change at least one of a position or a form of the vehicle seat based on the boarding information, wherein the controller is configured to change a position of the rear seat to move the rear seat forward by a first predetermined distance from a reference point, when the number of pieces of baggage is less than a first predetermined number of pieces of baggage, and wherein the controller is configured to change the position of the rear seat to move the rear seat forward by a second predetermined distance from the reference point, when the number of pieces of baggage is greater than or equal to the first predetermined number of pieces of baggage and less than a second predetermined number of pieces of baggage, the second predetermined distance being greater than the first predetermined distance.

2. The vehicle of claim 1, wherein the controller is configured to change the form of the vehicle seat to unfold the rear seat, when the number of occupants is less than a first predetermined number of occupants.

3. The vehicle of claim 1, wherein the controller is configured to change the form of the vehicle seat to unfold the rear seat and the second seat, when the number of occupants is greater than or equal to a first predetermined number of occupants and less than a second predetermined number of occupants.

4. The vehicle of claim 1, wherein the controller is configured to change the form of the vehicle seat to unfold the rear seat, the second seat and the first seat, when the number of occupants is greater than or equal to a second predetermined number of occupants.

5. The vehicle of claim 1, wherein the controller is configured to change the position of the rear seat to move the rear seat forward by a third predetermined distance from the reference point, when the number of pieces of baggage is greater than or equal to the second predetermined number of pieces of baggage and less than a third predetermined number of pieces of baggage, the third predetermined distance being greater than the second predetermined distance.

6. The vehicle of claim 5, wherein the communicator is configured to acquire the boarding information including information about a baggage size, and the controller is configured to change the position of the rear seat to move the rear seat forward by a fourth predetermined distance from the reference point, when the number of pieces of baggage is less than the first predetermined number of pieces of baggage and the baggage size is greater than or equal to a predetermined size, the fourth predetermined distance being greater than the first predetermined distance and less than the second predetermined distance.

7. The vehicle of claim 6, wherein the controller is configured to change the position of the rear seat to move the rear seat forward by a fifth predetermined distance from the reference point, when the number of pieces of baggage is greater than or equal to the first predetermined number of pieces of baggage and less than the second predetermined number of pieces of baggage and the baggage size is greater than or equal to the predetermined size, the fifth predetermined distance being greater than the second predetermined distance and less than the third predetermined distance.

8. The vehicle of claim 7, wherein the controller is configured to change the position of the rear seat to move the rear seat forward by a sixth predetermined distance from the reference point, when the number of pieces of baggage is greater than or equal to the third predetermined number of pieces of baggage and the baggage size is greater than or equal to the predetermined size, the sixth predetermined distance being greater than the third predetermined distance.

9. The vehicle of claim 1, wherein:

the communicator is configured to receive, from the user terminal, information corresponding to a user command input to each image displayed on a display of the user terminal, each of the images corresponding to the first seat, the second seat and the rear seat of the vehicle, and the controller is configured to change the at least one of the position or the form of the vehicle seat based on the information corresponding to the user command, the information being received through the communicator.

10. A control method of a vehicle, the control method comprising:

receiving boarding information including information about at least one of a number of occupants or a number of pieces of baggage from a user terminal through a communicator; and changing at least one of a position or a form of a vehicle seat based on the boarding information, the vehicle seat including at least one of a first seat, a second seat or a rear seat, wherein the changing of the at least one of the position or the form of the vehicle seat comprises changing a position of the rear seat to move the rear seat forward by a first predetermined distance from a reference point, when the number of pieces of baggage is less than a first predetermined number of pieces of baggage, and wherein the changing of the at least one of the position or the form of the vehicle seat comprises changing the position of the rear seat to move the rear seat forward by a second predetermined distance from the reference point, when the number of pieces of baggage is greater than or equal to the first predetermined number of pieces of baggage and less than a second predetermined number of pieces of baggage, the second predetermined distance being greater than the first predetermined distance.

11. The control method of claim 10, wherein the changing of the at least one of the position or the form of the vehicle seat comprises changing the form of the vehicle seat to unfold the rear seat, when the number of occupants is less than a first predetermined number of occupants.

12. The control method of claim 10, wherein the changing of the at least one of the position or the form of the vehicle seat comprises changing the form of the vehicle seat to unfold the rear seat and the second seat, when the number of occupants is greater than or equal to a first predetermined number of occupants and less than a second predetermined number of occupants.

13. The control method of claim 10, wherein the changing of the at least one of the position or the form of the vehicle seat comprises changing the form of the vehicle seat to unfold the rear seat, the second seat and the first seat, when the number of occupants is greater than or equal to a second predetermined number of occupants.

14. The control method of claim 10, wherein the changing of the at least one of the position or the form of the vehicle seat comprises changing the position of the rear seat to move the rear seat forward by a third predetermined distance from the reference point, when the number of pieces of baggage is greater than or equal to the second predetermined number of pieces of baggage and less than a third predetermined number of pieces of baggage, the third predetermined distance being greater than the second predetermined distance.

15. The control method of claim 14, wherein the changing of the at least one of the position or the form of the vehicle seat comprises acquiring the boarding information including information about a baggage size through the communicator, and changing the position of the rear seat to move the rear seat forward by a fourth predetermined distance from the reference point, when the number of pieces of baggage is less than the first predetermined number of pieces of baggage and the baggage size is greater than or equal to a predetermined size, the fourth predetermined distance being greater than the first predetermined distance and less than the second predetermined distance.

16. The control method of claim 15, wherein the changing of the at least one of the position or the form of the vehicle seat comprises changing the position of the rear seat to move the rear seat forward by a fifth predetermined distance from the reference point, when the number of pieces of baggage is greater than or equal to the first predetermined number of pieces of baggage and less than the second predetermined number of pieces of baggage and the baggage size is greater than or equal to the predetermined size, the fifth predetermined distance being greater than the second predetermined distance and less than the third predetermined distance.

17. The control method of claim 16, wherein the changing of the at least one of the position or the form of the vehicle seat comprises changing the position of the rear seat to move the rear seat forward by a sixth predetermined distance from the reference point, when the number of pieces of baggage is greater than or equal to the third predetermined number of pieces of baggage and the baggage size is greater than or equal to the predetermined size, the sixth predetermined distance being greater than the third predetermined distance.

18. The control method of claim 11, further comprising:

receiving information corresponding to a user command input to each image displayed on a display of the user terminal from the user terminal through the communicator, each of the images corresponding to the first seat, the second seat and the rear seat of the vehicle, and wherein the changing of the at least one of the position or the form of the vehicle seat comprises changing the at least one of the position or the form of the vehicle seat based on the information corresponding to the user command, the information being received through the communicator.

* * * * *